(12) United States Patent
Lu et al.

(10) Patent No.: US 12,432,440 B2
(45) Date of Patent: Sep. 30, 2025

(54) IMAGE PROCESSING METHOD, IMAGE PROCESSING APPARATUS, ELECTRONIC DEVICE, AND STORAGE MEDIUM

(71) Applicant: GUANGDONG OPPO MOBILE TELECOMMUNICATIONS CORP., LTD., Dongguan (CN)

(72) Inventors: Yinting Lu, Dongguan (CN); Xiaodong Gao, Dongguan (CN); Runda Dai, Dongguan (CN)

(73) Assignee: GUANGDONG OPPO MOBILE TELECOMMUNICATIONS CORP., LTD., Dongguan (CN)

( * ) Notice: Subject to any disclaimer, the term of this patent is extended or adjusted under 35 U.S.C. 154(b) by 302 days.

(21) Appl. No.: 18/088,399

(22) Filed: Dec. 23, 2022

(65) Prior Publication Data

US 2023/0131307 A1    Apr. 27, 2023

Related U.S. Application Data

(63) Continuation of application No. PCT/CN2021/098188, filed on Jun. 3, 2021.

(30) Foreign Application Priority Data

Jul. 3, 2020 (CN) .......................... 202010636450.5

(51) Int. Cl.
*H04N 23/63* (2023.01)
*G06F 3/04817* (2022.01)
(Continued)

(52) U.S. Cl.
CPC ....... *H04N 23/632* (2023.01); *G06F 3/04817* (2013.01); *G06F 3/0488* (2013.01); *H04N 23/62* (2023.01)

(58) Field of Classification Search
CPC .... H04N 23/632; H04N 23/62; H04N 23/631; H04N 23/80; H04N 23/63;
(Continued)

(56) References Cited

U.S. PATENT DOCUMENTS 9,830,121 B2 * 11/2017 Sirpal .................. G06F 3/0412
9,936,254 B2 *  4/2018 Seo .................. H04N 21/44222
(Continued)

FOREIGN PATENT DOCUMENTS

CN        101889431 A      11/2010
CN        103118169 A       5/2013
(Continued)

OTHER PUBLICATIONS

Reexamination notice from corresponding Chinese Application No. 202010636450.5, dated Jan. 18, 2023. English translation attached.
(Continued)

Primary Examiner — Chiawei Chen
(74) Attorney, Agent, or Firm — Sheppard, Mullin, Richter & Hampton LLP

(57) ABSTRACT

Embodiments of the present disclosure disclose an image processing method. The method includes: obtaining a trigger event from an interface of a photographing preview image; and displaying a sharing interface according to the trigger event, and displaying, in the sharing interface, one or more icons of one or more image sharing applications supported by an operating system of an electronic device. Each of the one or more icons is configured to share, in response to being triggered, an image corresponding to a thumbnail displayed in the interface of the photographing preview image via the application associated with the icon. The embodiments of the present disclosure further disclose an image processing apparatus, an electronic device, and a storage medium.

20 Claims, 7 Drawing Sheets

(51) Int. Cl.
  *G06F 3/0488* (2022.01)
  *H04N 23/62* (2023.01)
(58) Field of Classification Search
  CPC .. G06F 3/04817; G06F 3/0488; G06F 3/0482; G06F 3/04845; G06F 3/017; H04L 51/10
  See application file for complete search history.

(56) References Cited

U.S. PATENT DOCUMENTS

| | | | | |
|---|---|---|---|---|
| 10,079,040 | B2* | 9/2018 | Belliveau | G11B 27/007 |
| 10,282,056 | B2* | 5/2019 | Wei | G06F 3/04842 |
| 10,666,869 | B2* | 5/2020 | Mukherjee | H04N 23/632 |
| 11,768,694 | B2* | 9/2023 | Song | H04L 51/046 |
| | | | | 715/748 |
| 2013/0332512 | A1* | 12/2013 | Roman | G06F 16/176 |
| | | | | 709/203 |
| 2014/0071323 | A1* | 3/2014 | Yi | G06F 3/0486 |
| | | | | 348/333.01 |
| 2015/0009152 | A1* | 1/2015 | Tang | G06F 3/04883 |
| | | | | 345/173 |
| 2015/0103188 | A1* | 4/2015 | Lin | H04N 1/00145 |
| | | | | 348/207.11 |
| 2015/0235336 | A1* | 8/2015 | Crutchfield | G06F 16/58 |
| | | | | 382/100 |
| 2016/0291861 | A1* | 10/2016 | Song | G06F 3/04845 |
| 2018/0088764 | A1* | 3/2018 | Lu | G06F 3/0484 |
| 2018/0205680 | A1 | 7/2018 | Xiao | |
| 2021/0124469 | A1* | 4/2021 | Choi | H04L 51/046 |
| 2021/0144272 | A1* | 5/2021 | Asai | H04N 1/2166 |
| 2022/0343648 | A1* | 10/2022 | Chen | H04N 5/772 |
| 2022/0391232 | A1* | 12/2022 | Song | G06F 3/0484 |

FOREIGN PATENT DOCUMENTS

| | | |
|---|---|---|
| CN | 103369048 A | 10/2013 |
| CN | 103677609 A | 3/2014 |
| CN | 105955607 A | 9/2016 |
| CN | 106060374 A | 10/2016 |
| CN | 106293338 A | 1/2017 |
| CN | 108153900 A | 6/2018 |
| CN | 108536365 A | 9/2018 |
| CN | 110072071 A | 7/2019 |
| CN | 110213440 A | 9/2019 |
| CN | 111127595 A | 5/2020 |
| CN | 111866379 A | 10/2020 |
| CN | 112839163 A | 5/2021 |
| JP | 2003308439 A | 10/2003 |
| KR | 1020160118001 A | 10/2016 |
| WO | 2019137429 A1 | 7/2019 |

OTHER PUBLICATIONS

Reexamination Decision from corresponding Chinese Application No. 202010636450.5, dated Mar. 24, 2023 . English translation attached.
Extended European Search Report dated Nov. 3, 2023 received in European Patent Application No. EP21832748.4.
International Search Report and Written Opinion dated Aug. 26, 2021 in International Application No. PCT/CN2021/098188. English translation attached.
First Office Action from corresponding Chinese Application No. 202010636450.5, dated May 8, 2021 . English translation attached.
The Second Office Action from corresponding Chinese Application No. 202010636450.5, dated Oct. 15, 2021 . English translation attached.
The Third Office Action from corresponding Chinese Application No. 202010636450.5, dated Feb. 15, 2022 . English translation attached.
The Rejection Decision from corresponding Chinese Application No. 202010636450.5, dated May 16, 2022 . English translation attached.
1 EPO, Communication pursuant to Article 94(3) EPC for EP Application No. 21832748.4 mailed on Jul. 9, 2025.

* cited by examiner

IMAGE PROCESSING METHOD, IMAGE PROCESSING APPARATUS, ELECTRONIC DEVICE, AND STORAGE MEDIUM

CROSS-REFERENCE TO RELATED APPLICATION

The present application is a continuation of International application No. PCT/CN2021/098188 filed on Jun. 3, 2021, which claims priority to Chinese Patent Application No. 202010636450.5 entitled "IMAGE PROCESSING METHOD, IMAGE PROCESSING APPARATUS, ELECTRONIC DEVICE, AND STORAGE MEDIUM" and filed with China National Intellectual Property Administration on Jul. 3, 2020, the entire disclosures of both of which are incorporated herein by reference.

FIELD

The present disclosure relates to, but is not limited to, the field of image processing technologies, and more particularly, to an image processing method, an image processing apparatus, an electronic device, and a storage medium.

BACKGROUND

Currently, when a user captures an image with an electronic device such as a mobile phone, a thumbnail of the captured image is displayed in a specific region of a photographing interface. In the related art, in order to share the image corresponding to the thumbnail to an application associated with a camera, a user needs to click on the thumbnail to go to the image and then click on a sharing button.

SUMMARY

Embodiments of the present disclosure provide an image processing method, an image processing apparatus, an electronic device, and a storage medium.

Technical solutions of the present disclosure are implemented in the following manners.

An image processing method is provided. The method includes: obtaining a trigger event from an interface of a photographing preview image; and invoking and displaying a sharing interface according to the trigger event, and displaying, in the sharing interface, one or more icons of one or more image sharing applications supported by an operating system of an electronic device. Each of the one or more icons is configured to share, in response to being triggered, an image corresponding to a thumbnail displayed in the interface of the photographing preview image via the application associated with the icon.

An image processing apparatus is provided. The image processing apparatus includes: an obtaining module configured to obtain a trigger event from an interface of a photographing preview image; a processing module configured to invoke a sharing interface according to the trigger event; and a display module configured to display the sharing interface, and display, in the sharing interface, one or more icons of one or more image sharing applications supported by an operating system of an electronic device. Each of the one or more icons is configured to share, in response to being triggered, an image corresponding to a thumbnail displayed in the interface of the photographing preview image via the application associated with the icon.

An electronic device is provided. The electronic device includes: a processor; a memory; and a communication bus. The communication bus is configured to implement a communication connection between the processor and the memory. The processor is configured to execute an image processing program stored in the memory to implement the steps of the image processing method as described above.

A storage medium is provided. The storage medium stores one or more programs. The one or more programs are executable by one or more processors to implement the steps of the image processing method as described above.

According to the embodiments of the present disclosure, an image processing method, an image processing apparatus, an electronic device, and a storage medium are provided. The trigger event is obtained from the interface of the photographing preview image. The sharing interface is invoked and displayed according to the trigger event. The one or more icons of the one or more image sharing applications supported by the operating system of the electronic device are displayed in the sharing interface. Each of the one or more icons is configured to share, in response to being triggered, the image corresponding to the thumbnail displayed in the interface of the photographing preview image via the application associated with the icon. That is, the present disclosure at least provides a portal for quick image sharing.

DETAILED DESCRIPTION

Figure 1:
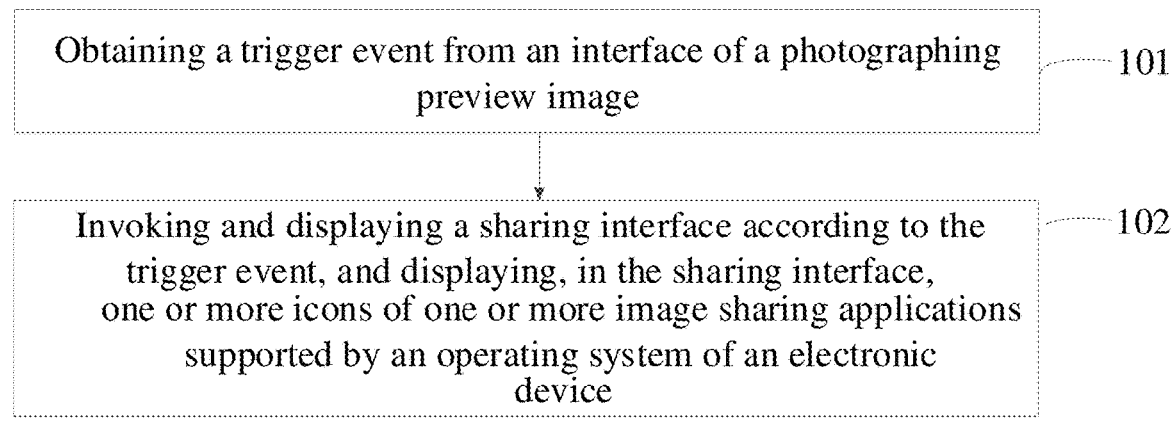
FIG. 1 is a first schematic flowchart illustrating an image processing method according to an embodiment of the present disclosure.

In order to make the objects, technical solutions, and advantages of the present disclosure more apparent, the present disclosure will be described in detail with reference to the accompanying drawings. The embodiments described here should not be construed as limiting the present disclosure. Other embodiments obtained by those skilled in the art without creative labor shall fall within scope of the present disclosure.

In the following description, reference is made to "some embodiments", which describe a subset of all possible embodiments. However, it should be understood that "some embodiments" may be the same subset or different subsets of all possible embodiments and can be combined with each other without any conflict.

In the following description, terms "first/second/third" involved are used only to distinguish similar objects and do not represent a particular sequence for objects. It should be understood that "first/second/third" may be interchanged in a particular order or sequence where permitted, so that the embodiments of the present disclosure described herein can be implemented in a sequence other than that illustrated or described herein.

Unless otherwise defined, all technical and scientific terms used herein have the same meaning as commonly understood by those skilled in the art to which the present disclosure belongs to. The terms used herein are for the purpose of describing embodiments of the present disclosure only and are not intended to limit the present disclosure.

In the related art, in order to share an image corresponding to a thumbnail to an application associated with a camera, a user needs to click on the thumbnail to go to the image and then click on a sharing button. That is, in the related art, there is at least a problem of poor user experience resulted from complicated image sharing operations.

An image processing method is provided. The image processing method includes: obtaining a trigger event from an interface of a photographing preview image; and invoking and displaying a sharing interface according to the trigger event, and displaying, in the sharing interface, one or more icons of one or more image sharing applications supported by an operating system of an electronic device. Each of the one or more icons is configured to share, in response to being triggered, an image corresponding to a thumbnail displayed in the interface of the photographing preview image via the application associated with the icon.

In the above solution, the operation of obtaining the trigger event from the interface of the photographing preview image includes: obtaining, from the interface of the photographing preview image, operation information of an operator on the thumbnail; and generating the trigger event in response to determining that the operation information indicates invocation and display of the sharing interface.

In the above solution, the operation of obtaining the trigger event from the interface of the photographing preview image includes: obtaining an operation gesture of an operator from the interface of the photographing preview image; and generating the trigger event in response to determining that the operation gesture indicates invocation and display of the sharing interface.

In the above solution, the operation of invoking and displaying the sharing interface according to the trigger event includes: invoking and displaying an editing interface according to the trigger event, and displaying the image corresponding to the thumbnail in the editing interface; editing the image in response to an editing operation on the image in the editing interface, and obtaining and saving the edited image, the image corresponding to the thumbnail displayed in the interface of the photographing preview image being the edited image; and invoking and displaying the sharing interface in response to a sharing operation on the edited image.

In the above solution, the method further includes, subsequent to the operation of displaying the image corresponding to the thumbnail in the editing interface: invoking and displaying the interface of the photographing preview image in response to a hiding operation in the editing interface.

In the above solution, the method further includes, subsequent to the operation of displaying, in the sharing interface, the one or more icons of the one or more image sharing applications supported by the operating system of the electronic device: sharing, in response to a selection operation performed by an operator on at least one of the one or more icons, the image corresponding to the thumbnail via an application associated with the at least one icon.

In the above solution, the operation of displaying, in the sharing interface, the one or more icons of the one or more image sharing applications supported by the operating system of the electronic device includes: displaying the one or more icons in the sharing interface together with the image corresponding to the thumbnail. The method further includes: performing, in response to a switching operation on the displayed image in the sharing interface, image switching based on an image stored in an image storage unit of the electronic device; and obtaining a target image selected by the operator during the image switching. The method further includes, subsequent to the operation of sharing the image corresponding to the thumbnail via the application associated with the at least one icon: sharing the target image via the application associated with the at least one icon.

An image processing apparatus is provided. The image processing apparatus includes: an obtaining module configured to obtain a trigger event from an interface of a photographing preview image; a processing module configured to invoke a sharing interface according to the trigger event; and a display module configured to display the sharing interface, and display, in the sharing interface, one or more icons of one or more image sharing applications supported by an operating system of an electronic device. Each of the one or more icons is configured to share, in response to being triggered, an image corresponding to a thumbnail displayed in the interface of the photographing preview image via the application associated with the icon.

In the above solution, the obtaining module is configured to obtain, from the interface of the photographing preview image, operation information of an operator on the thumbnail. The processing module is configured to generate the trigger event in response to determining that the operation information indicates invocation and display of the sharing interface.

In the above solution, the obtaining module is configured to obtain an operation gesture of an operator from the interface of the photographing preview image. The processing module is configured to generate the trigger event in response to determining that the operation gesture indicates invocation and display of the sharing interface.

In the above solution, the processing module is configured to invoke an editing interface according to the trigger event. The display module is configured to display the editing interface, and display the image corresponding to the thumbnail in the editing interface. The processing module is further configured to edit the image in response to an editing operation on the image in the editing interface, and obtain and save the edited image, the image corresponding to the thumbnail displayed in the interface of the photographing preview image being the edited image. The processing module is further configured to invoke the sharing interface in response to a sharing operation on the edited image.

In the above solution, the processing module is configured to invoke the interface of the photographing preview image in response to a hiding operation in the editing interface, and the display module is configured to display the interface of the photographing preview image.

In the above solution, the processing module is configured to share, in response to a selection operation performed by an operator on at least one of the one or more icons, the image corresponding to the thumbnail via an application associated with the at least one icon.

In the above solution, the display module is configured to display the one or more icons in the sharing interface together with the image corresponding to the thumbnail. The processing module is configured to perform, in response to a switching operation on the displayed image in the sharing interface, image switching based on an image stored in an image storage unit of the electronic device. The obtaining module is configured to obtain a target image selected by the operator during the image switching. The processing module is further configured to share the target image via the application associated with the at least one icon.

An electronic device is provided. The electronic device includes: a processor; a memory; and a communication bus. The communication bus is configured to implement a communication connection between the processor and the memory. The processor is configured to execute an image processing program stored in the memory to implement the steps of the image processing method as described above.

A storage medium is provided. The storage medium stores one or more programs. The one or more programs are executable by one or more processors to implement the steps of the image processing method as described above.

According to an embodiment of the present disclosure, an image processing method is provided. The image processing method is applied in an electronic device. As illustrated in FIG. 1, the method includes actions at blocks 101 and 102.

At block 101, a trigger event is obtained from an interface of a photographing preview image.

In the embodiments of the present disclosure, the electronic device may be a mobile terminal device such as a mobile phone, a tablet computer, a laptop computer, a Personal Digital Assistant (PDA), a camera, a wearable device, or a fixed terminal device such as a desktop computer.

Here, the interface of the photographing preview image includes a photographing preview window, a control region for controlling a preview window, and a thumbnail region. The photographing preview window is a viewfinder. In some implementable scenarios, a photographing range corresponding to the viewfinder is the same as a field of view of an operator of the electronic device. In other implementable scenarios, the viewfinder includes at least one filter window. For example, the viewfinder is a full-screen photographing window when the viewfinder includes one filter window; or the viewfinder is a nine-grid photographing window when the viewfinder includes a plurality of filter windows, e.g., nine filter windows. The control region includes a touch button and a photographing button. The photographing button is configured to control photographing to obtain the photographed content. The touch button is configured to adjust attribute parameters of the photographed content presented in the photographing preview window. For example, when the photographing preview window is a full-screen window, the touch button can be used to switch to a filter window corresponding to the full-screen window to capture images in different filter modes. Of course, in a case where the viewfinder includes one window, images may be captured based on a filterless mode.

The thumbnail region shows a thumbnail of an image captured over a nearest predetermined period of time. It should be noted that a number of thumbnails displayed in the thumbnail region may be set based on an actual requirement. Accordingly, a size of one or more thumbnails displayed in the thumbnail region may be set based on the number of the one or more thumbnails. At least one thumbnail is displayed in the thumbnail region. Here, an image corresponding to the thumbnail includes at least one frame. That is, the image corresponding to the thumbnail may be one frame of image, i.e., one picture, or the images corresponding to the thumbnail may also be a collection of images that includes at least two ordered frames of images, in which case the collection of images forms a video.

In the embodiments of the present disclosure, the trigger event is configured to invoke a sharing interface. The sharing interface is a sharing portal for quickly sharing the image corresponding to the thumbnail.

At block 102, a sharing interface is invoked and displayed according to the trigger event, and one or more icons of one or more image sharing applications supported by an operating system of an electronic device are displayed in the sharing interface.

Here, each of the one or more icons is configured to share, in response to being triggered, an image corresponding to a thumbnail displayed in the interface of the photographing preview image via the application associated with the icon.

In the embodiments of the present disclosure, the sharing interface displays one or more icons of one or more image sharing applications supported at an operating system level. That is, cons of all applications supported by the operating system of the electronic device that are capable of performing image sharing are displayed in the sharing interface. In this way, a sharing range is expanded, which provides more sharing channels to support image sharing. For example, the one or more image sharing applications supported at the operating system level include, but are not limited to, at least one of an instant messaging application, a short message application, an email application, a near field communication application, an editing application, or an information collection application.

In some embodiments, in a case where the trigger event is obtained from the interface of the photographing preview image, the electronic device invokes and displays the sharing interface according to the trigger event, and displays, in the sharing interface, the one or more icons of the one or more image sharing applications supported by the operating system of the electronic device, which facilitates invoking, by the operator, an application for image sharing based on the icon of the application in the sharing interface. That is, in the present disclosure, by means of the trigger event, an image sharing portal can be quickly provided, and the image corresponding to the thumbnail can be directly shared, which eliminates an operation of clicking on the thumbnail for an enlargement. Also, the system-level image sharing portal provided by the present disclosure makes a wider selection of sharing objects possible, improves sharing efficiency, and expands the sharing range, which enhance user experience.

With the image processing method according to the embodiments of the present disclosure, the trigger event is obtained from the interface of the photographing preview image. The sharing interface is invoked and displayed according to the trigger event. The one or more icons of the one or more image sharing applications supported by the operating system of the electronic device are displayed in the sharing interface. Each of the one or more icons is configured to share, in response to being triggered, the image corresponding to the thumbnail displayed in the interface of the photographing preview image via the application associated with the icon. That is, in the present disclosure, the sharing interface is invoked according to the trigger event. The sharing interface provides icons of all image sharing applications supported by the operating system of the electronic device, such that the image corresponding to the thumbnail can be quickly shared through any application under the operating system, thereby providing a quick image sharing portal and enhancing the user experience.

Figure 2:
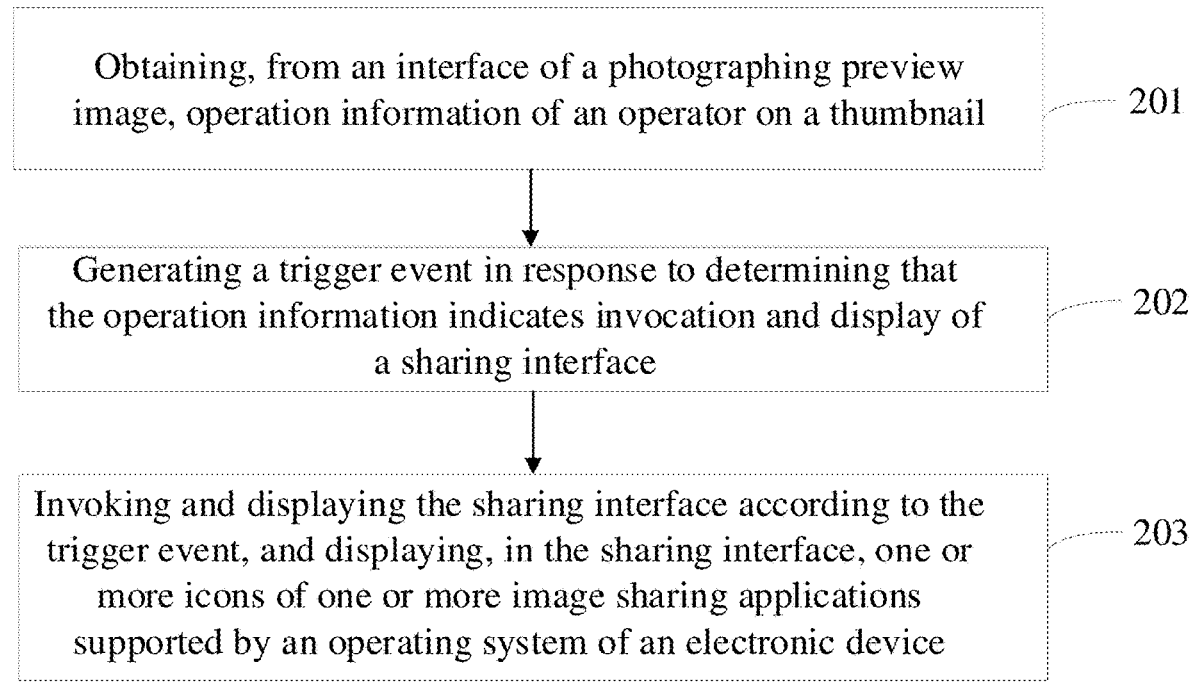
FIG. 2 is a second schematic flowchart illustrating an image processing method according to an embodiment of the present disclosure.

According to an embodiment of the present disclosure, an image processing method is provided. The image processing method is applied in an electronic device. As illustrated in FIG. 2, the method includes actions at blocks 201 to 203.

At block 201, operation information of an operator on a thumbnail is obtained from an interface of a photographing preview image.

In the embodiment of the present disclosure, the operation information includes an operation position and an operation event. For example, the operator clicks on a dynamic arrow region on the thumbnail or slides up on the region of the thumbnail. When the operator clicks on the dynamic arrow region on the thumbnail, the operation information includes an operation position of an edge of the thumbnail and an operation event of a click operation. When the operator slides up in the region of the thumbnail, the operation information includes an operation position corresponding to a trajectory from one point on the thumbnail to another point in the interface of the photographing preview image and an operation event of a sliding operation.

At block 202, a trigger event is generated in response to determining that the operation information indicates invocation and display of a sharing interface.

In the embodiment of the present disclosure, the electronic device generates the trigger event for invoking the sharing interface when determining that the operation information indicates invocation and display of the sharing interface.

At block 203, the sharing interface is invoked and displayed according to the trigger event, and one or more icons of one or more image sharing applications supported by an operating system of an electronic device are displayed in the sharing interface.

Here, each of the one or more icons is configured to share, in response to being triggered, an image corresponding to the thumbnail displayed in the interface of the photographing preview image via the application associated with the icon.

Figure 3:
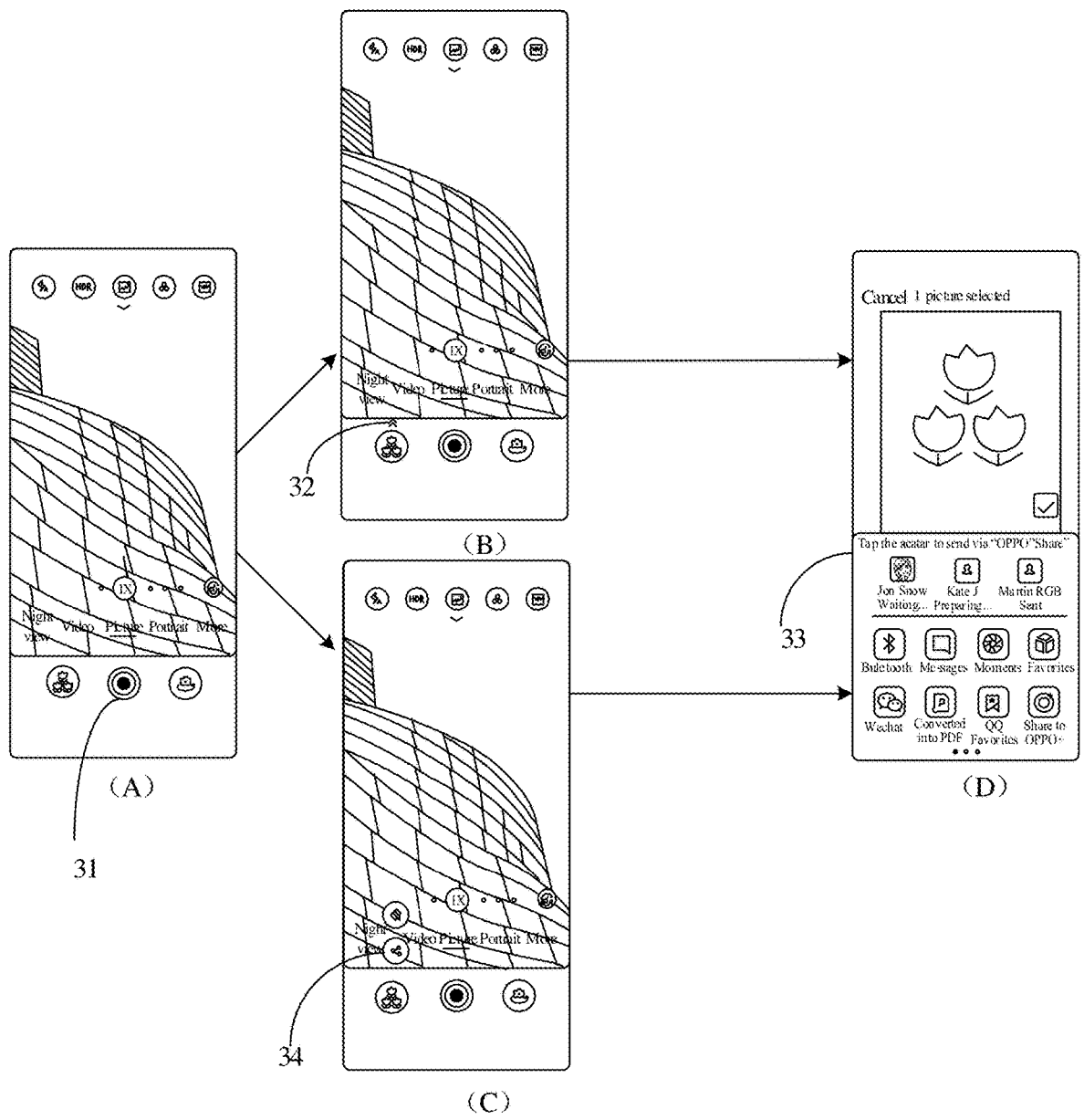
FIG. 3 is a schematic diagram showing, through (A) to (D), an interface of an image processing method according to an embodiment of the present disclosure.

For example, as illustrated in (A) to (D) in FIG. 3, description is made by taking capturing one image as an example. The electronic device obtains one image when the operator clicks on a photographing button 31 illustrated in (A) in FIG. 3 in a the interface of the photographing preview image. The electronic device detects whether operation information of the operator on a thumbnail is obtained. Here, the thumbnail presents content that has been photographed and the photographing preview window presents content that is to be photographed. The thumbnail and the photographing preview window can present different contents, i.e., different photographing objects. Of course, the thumbnail and the photographing preview window can present the same content. For example, in a photographing scenario in which the operator performs image capturing on a same photographing object for a plurality of times, the thumbnail and the photographing preview window present the same content. Further, as an example, the thumbnail and the photographing preview window present different contents. With reference to (A) to (D) in FIG. 3, a photographing object presented by the thumbnail is a flower and a photographing object presented by the photographing preview window is a building. Schemes implemented in the present disclosure to quickly invoke the sharing interface are described below. Scheme 1: as illustrated in (B) in FIG. 3, when the operator clicks on a dynamic arrow region 32 on the thumbnail, the operation information includes an operation position of an edge of the thumbnail and an operation event of a click operation. The electronic device detects the operation information of the operator on the thumbnail and determines that the operation information indicates invocation and display of a sharing interface 33 illustrated in (D) in FIG. 3, so as to generate a trigger event. The electronic device invokes and displays the sharing interface according to the trigger event, and displays, in the sharing interface, icons of image sharing applications supported by an operating system of the electronic device. Scheme 2: as illustrated in (C) in FIG. 3, when the operator slides up on the thumbnail region, the operation information includes an operation position corresponding to a trajectory from one point on the thumbnail to another point in the interface of the photographing preview image and an operation event of a sliding operation. The electronic device detects the operation information of the operator on the thumbnail and determines that the operation information indicates the invocation and the display of the sharing interface 33, so as to generate a trigger event. The electronic device invokes and displays the sharing interface according to the trigger event, and displays, in the sharing interface, icons of the image sharing applications supported by the operating system of the electronic device. Here, in scheme 2, the electronic device may also display a sharing button 34 illustrated in (C) in FIG. 3 after obtaining a sliding-up operation. Further, the operator clicks on the sharing button 34 to invoke and display the sharing interface 33, which enriches implementations of invoking the sharing interface 33.

It should be noted that for description of the same steps and the same content in this embodiment as in other embodiments, reference may be made to the description of the other embodiments, and thus details thereof will be omitted here.

Figure 4:
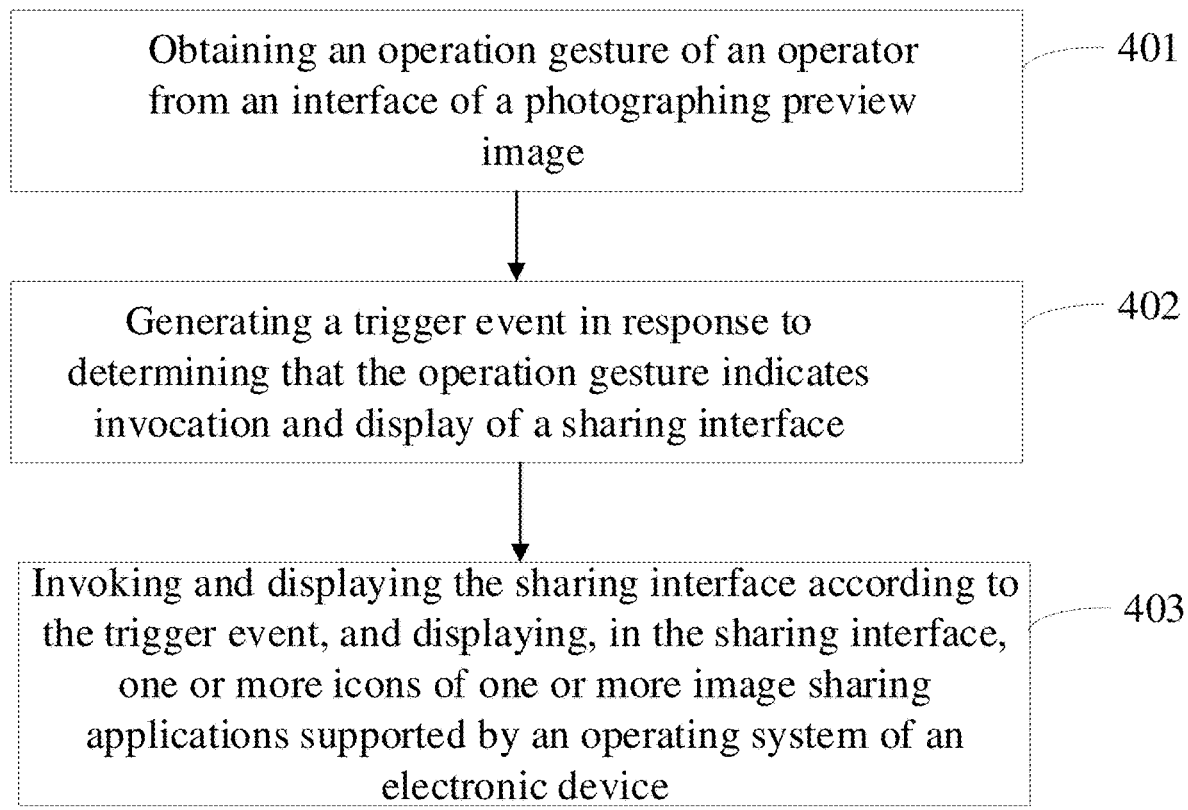
FIG. 4 is a third schematic flowchart illustrating an image processing method according to an embodiment of the present disclosure.

According to an embodiment of the present disclosure, an image processing method is provided. The image processing method is applied in an electronic device. As illustrated in FIG. 4, the method includes actions at blocks 401 to 403.

At block 401, an operation gesture of an operator is obtained from an interface of a photographing preview image.

In the embodiment of the present disclosure, the electronic device can quickly and easily invoke the sharing interface by means of the operation gesture of the operator.

For example, the operation gesture may be a tap gesture. The electronic device performs a detection through a sensor such as a gyroscope and an accelerometer. A tap as an input gesture may be determined by the sensor in any state of the electronic device.

At block 402, a trigger event is generated in response to determining that the operation gesture indicates invocation and display of a sharing interface.

In the embodiment of the present disclosure, when the electronic device detects the operation gesture and determines that the operation gesture indicates invocation and display of the sharing interface, the trigger event is generated.

For example, in a photographing scenario, the electronic device such as a smartphone determines, in response to detecting a tapping operation gesture performed by the operator, that the operation gesture indicates the invocation and the display of the sharing interface, and generates the trigger event for invoking the sharing interface.

At block 403, the sharing interface is invoked and displayed according to the trigger event, and one or more icons of one or more image sharing applications supported by an operating system of an electronic device are displayed in the sharing interface.

Here, each of the one or more icons is configured to share, in response to being triggered, an image corresponding to a thumbnail displayed in the interface of the photographing preview image via the application associated with the icon. In this way, a quick invocation of the sharing interface based on the tap gesture is achieved, which in turn provides a portal for image sharing.

It should be noted that for description of the same steps and the same content in this embodiment as in other embodiments, reference may be made to the description of the other embodiments, and thus details thereof will be omitted here.

Figure 5:
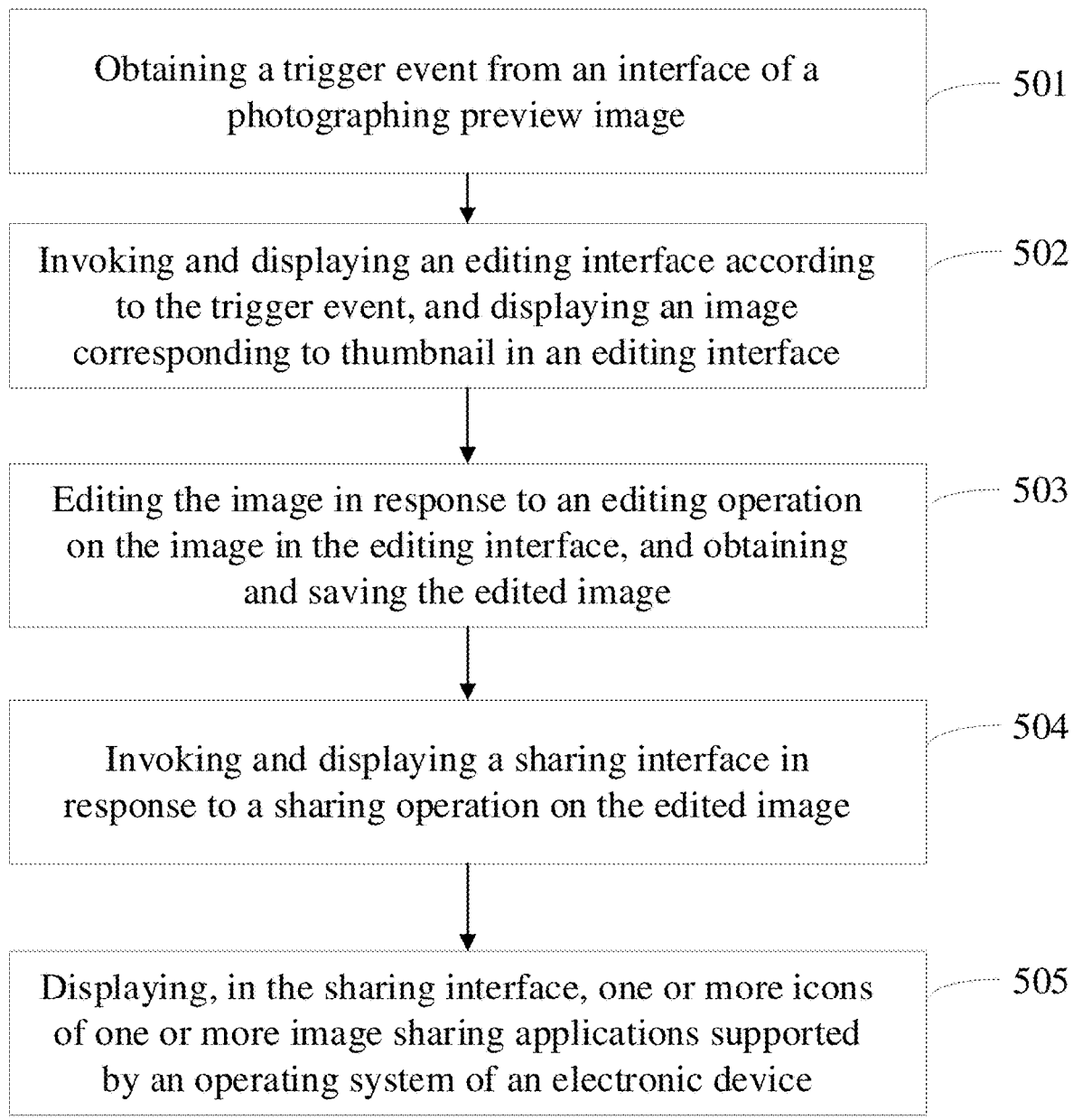
FIG. 5 is a fourth schematic flowchart illustrating an image processing method according to an embodiment of the present disclosure.

According to an embodiment of the present disclosure, an image processing method is provided. The image processing method is applied in an electronic device. As illustrated in FIG. 5, the method includes actions at blocks 501 to 505.

At block 501, a trigger event is obtained from an interface of a photographing preview image.

At block 502, an editing interface is invoked and displayed according to the trigger event, and an image corresponding to a thumbnail is displayed in the editing interface.

In the embodiment of the present disclosure, after obtaining the trigger event, the electronic device may invoke the editing interface according to the trigger event, and then invoke a sharing interface, which provides not only a quick editing portal but also a quick sharing portal, simplifying operation complexity of the operator in a process of processing the image, improving efficiency of image processing, and enhancing the user experience.

At block 503, the image is edited in response to an editing operation on the image in the editing interface, and the edited image is obtained and saved.

Here, the image corresponding to the thumbnail displayed in the interface of the photographing preview image is the edited image.

Here, in a case where the electronic device invokes the editing interface first, after the operator edits the image corresponding to the thumbnail based on the editing interface to obtain the edited image, the electronic device saves the edited image and updates the image corresponding to the thumbnail as the edited image.

At block 504, a sharing interface is invoked and displayed in response to a sharing operation on the edited image.

Here, the sharing operation may be an operation in which in the editing interface, the operator clicks on a sharing and sending button in the editing interface. The electronic device invokes and displays the sharing interface in response to the sharing operation on the edited image.

At block 505, one or more icons of one or more image sharing applications supported by an operating system of an electronic device are displayed in the sharing interface.

Here, each of the one or more icons is configured to share, in response to being triggered, an image corresponding to a thumbnail displayed in the interface of the photographing preview image via the application associated with the icon.

In another embodiment of the present disclosure, the method further includes, subsequent to the operation of displaying the image corresponding to the thumbnail in the editing interface at block: invoking and displaying the interface of the photographing preview image in response to a hiding operation in the editing interface. That is, in the editing interface, when the electronic device receives the hiding operation to hide the editing interface, the electronic device exits the editing interface to invoke and display the interface of the photographing preview image.

Figure 6:
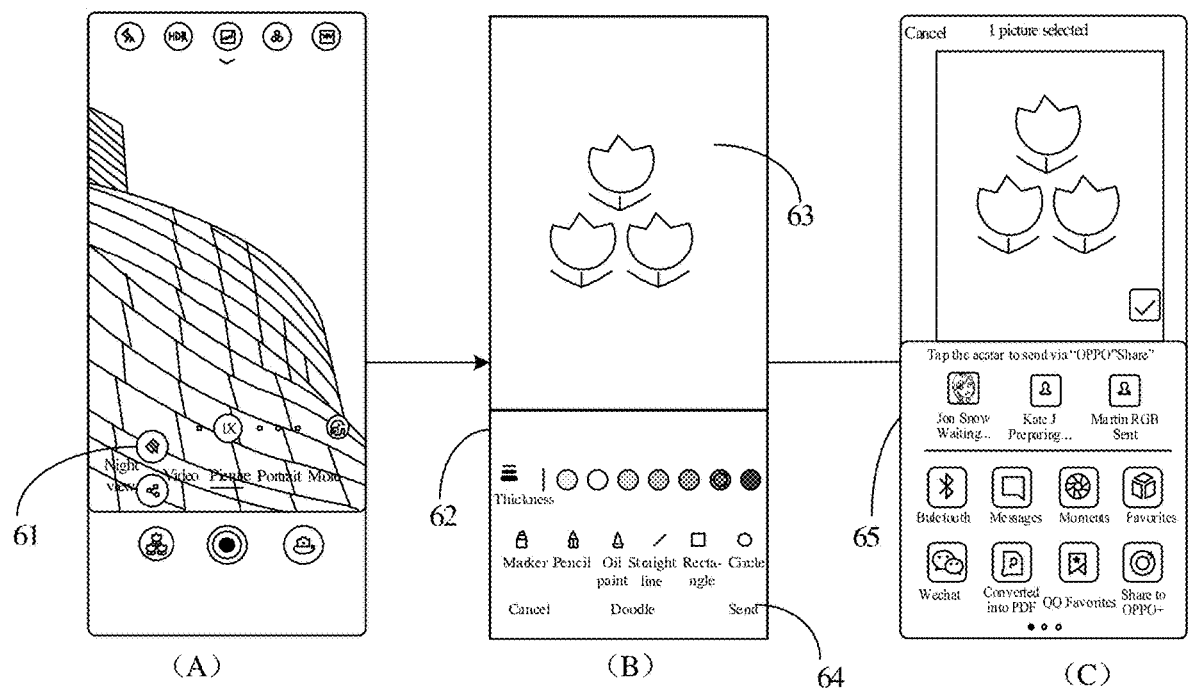
FIG. 6 is a schematic diagram showing, through (A) to (C), an interface of an image processing method according to another embodiment of the present disclosure.

For example, as illustrated in (A) to (C) in FIG. 6, description is made by taking capturing one image as an example. In an interface of a photographing preview image, the interface of the photographing preview image includes the thumbnail of an image previously captured, and contents presented by the thumbnail and the interface of the photographing preview image are different. As an example, still, a photographing object presented by the thumbnail is a flower and a photographing object presented by the photographing preview window is a building. When an operator slides up in the thumbnail region, operation information includes an operation position corresponding to a trajectory from one point on the thumbnail to another point in the interface of the photographing preview image and an operation event of a sliding operation. The electronic device detects the operation information of the operator on the thumbnail. After the electronic device obtains the sliding-up operation, an editing button 61 shown in (A) in FIG. 6 is displayed. Further, the operator clicks on the editing button 61 to invoke and display an editing interface 62 shown in (B) in FIG. 6. An image 63 corresponding to the thumbnail is displayed in the editing interface 62. Further, the electronic device edits the image in response to an editing operation on the image in the editing interface 62, and obtains and saves the edited image. The electronic device invokes and displays a sharing interface 65 shown in (C) in FIG. 6 (the sharing interface 65 in (C) in FIG. 6 corresponds to the sharing interface 33 in (D) in FIG. 3) in response to the sharing operation on the edited image, e.g., a click operation on Send 64 in the editing interface, and displays, in the sharing interface 65, icons of image sharing applications supported by the operating system of the electronic device.

Figure 7:
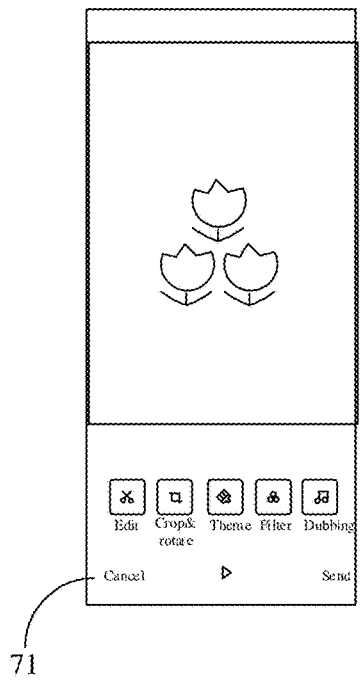
FIG. 7 is another schematic diagram showing an interface of an image processing method according to an embodiment of the present disclosure.

For example, as illustrated in FIG. 7, description is made by taking an example of editing a video. The video is obtained by photographing flowers. In the editing interface, the electronic device obtains a click operation of the operator on Cancel 71 in the editing interface. The electronic device invokes and displays the interface of the photographing preview image in response to a hiding operation in the editing interface.

It should be noted that for description of the same steps and the same content in this embodiment as in other embodiments, reference may be made to the description of the other embodiments, and thus details thereof will be omitted here.

Figure 8:
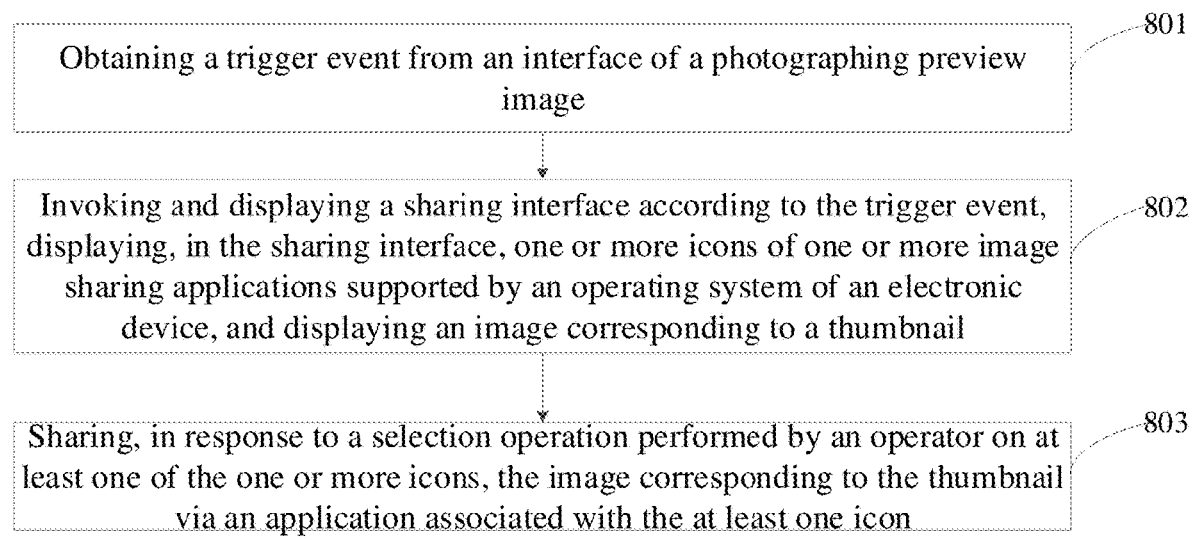
FIG. 8 is a fifth schematic flowchart illustrating an image processing method according to an embodiment of the present disclosure.

According to an embodiment of the present disclosure, an image processing method is provided. The image processing method is applied in an electronic device. As illustrated in FIG. 8, the method includes actions at blocks 801 to 803.

At block 801, a trigger event is obtained from an interface of a photographing preview image.

At block 802, a sharing interface is invoked and displayed according to the trigger event, one or more icons of one or more image sharing applications supported by an operating system of an electronic device are displayed in the sharing interface, and an image corresponding to a thumbnail is displayed.

Here, each of the one or more icons is configured to share, in response to being triggered, an image corresponding to a thumbnail displayed in the interface of the photographing preview image via the application associated with the icon.

At block 803, the image corresponding to the thumbnail is shared, in response to a selection operation performed by an operator on at least one of the one or more icons, via an application associated with the at least one icon.

In other embodiments of the present disclosure, after the action at block 802 of invoking and displaying the sharing interface according to the trigger event, displaying the one or more icons of the one or more image sharing applications supported by the operating system of the electronic device in the sharing interface, and displaying the image corresponding to the thumbnail, the following actions may also be performed.

Firstly, in response to a switching operation on the displayed image in the sharing interface, image switching is performed based on an image stored in an image storage unit of the electronic device. That is, in this case, a region used to display an image in the sharing interface is a window region in which the displayed image comes from the image storage unit of the electronic device. The operator may perform the switching operation to change the image displayed in the window region, and also filter the displayed image. Any selected image may be used as a sharing image.

Secondly, a target image selected by the operator during the image switching is obtained.

In other embodiments of the present disclosure, the target image may be shared via the application associated with the at least one icon after or simultaneously with the action at block 803 of sharing, in response to the selection operation performed by the operator on the at least one of the one or more icons, the image corresponding to the thumbnail via the application associated with the at least one icon.

Here, the sharing interface may be invoked by a quick invoking operation and sharing of at least one image can be achieved, which improves the sharing efficiency and enhances the user experience. As can be seen from the above description, the present disclosure supports quick sharing and edition of photos and videos. A number of applications supporting the quick sharing is not limited, as long as they are applications that support the image sharing under the operating system. In the present disclosure, an operation path of the image sharing is shortened and timeliness of sharing is improved.

It should be noted that for description of the same steps and the same content in this embodiment as in other embodiments, reference may be made to the description of the other embodiments, and thus details thereof will be omitted here.

Figure 9:
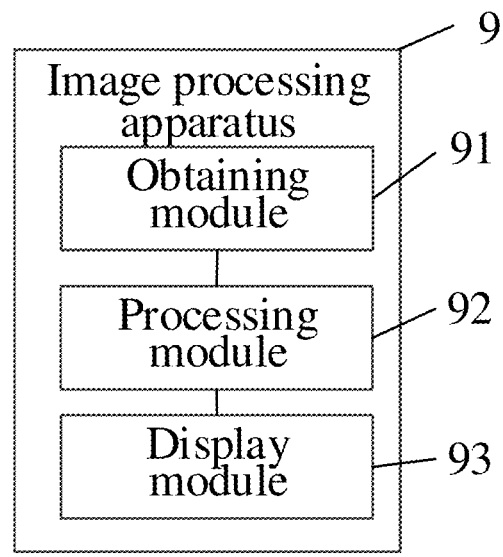
FIG. 9 is a schematic diagram showing a structure of an image processing apparatus according to an embodiment of the present disclosure.

According to an embodiment of the present disclosure, an image processing apparatus is provided. The image processing apparatus may be applied in the image processing method according to any of the embodiments corresponding to FIG. 1, FIG. 2, FIG. 4, FIG. 5, and FIG. 8. Referring to FIG. 9, an image processing apparatus 9 includes an obtaining module 91, a processing module 92, and a display module 93.

The obtaining module 91 is configured to obtain a trigger event from an interface of a photographing preview image.

The processing module 92 is configured to invoke a sharing interface according to the trigger event.

The display module 93 is configured to display the sharing interface, and display, in the sharing interface, one or more icons of one or more image sharing applications supported by an operating system of an electronic device.

Here, each of the one or more icons is configured to share, in response to being triggered, an image corresponding to a thumbnail displayed in the interface of the photographing preview image via the application associated with the icon.

In another embodiment of the present disclosure, the obtaining module 91 is further configured to obtain, from the interface of the photographing preview image, operation information of an operator on the thumbnail; and generate the trigger event in response to determining that the operation information indicates invocation and display of the sharing interface.

In another embodiment of the present disclosure, the obtaining module 91 is further configured to obtain an operation gesture of an operator from the interface of the photographing preview image; and generate the trigger event in response to determining that the operation gesture indicates invocation and display of the sharing interface.

In still another embodiment of the present disclosure, the processing module 92 is further configured to invoke and display an editing interface according to the trigger event, and display the image corresponding to the thumbnail in the editing interface; edit the image in response to an editing operation on the image in the editing interface, and obtain and save the edited image, the image corresponding to the thumbnail displayed in the interface of the photographing preview image being the edited image; and invoke the sharing interface in response to a sharing operation on the edited image.

In another embodiment of the present disclosure, the processing module 92 is further configured to invoke the interface of the photographing preview image in response to a hiding operation in the editing interface. The display module 93 is configured to display the interface of the photographing preview image.

In another embodiment of the present disclosure, the processing module 92 is further configured to share, in response to a selection operation performed by an operator on at least one of the one or more icons, the image corresponding to the thumbnail via an application associated with the at least one icon.

In another embodiment of the present disclosure, the display module 93 is further configured to display the one or more icons in the sharing interface together with the image corresponding to the thumbnail.

In another embodiment of the present disclosure, the processing module 92 is further configured to perform, in response to a switching operation on the displayed image in the sharing interface, image switching based on an image stored in an image storage unit of the electronic device; and obtain a target image selected by the operator during the image switching.

In another embodiment of the present disclosure, the processing module 92 is further configured to share the target image via the application associated with the at least one icon.

It should be noted that for description of the same steps and the same content in this embodiment as in other embodiments, reference may be made to the description of the other embodiments, and thus details thereof will be omitted here.

Figure 10:
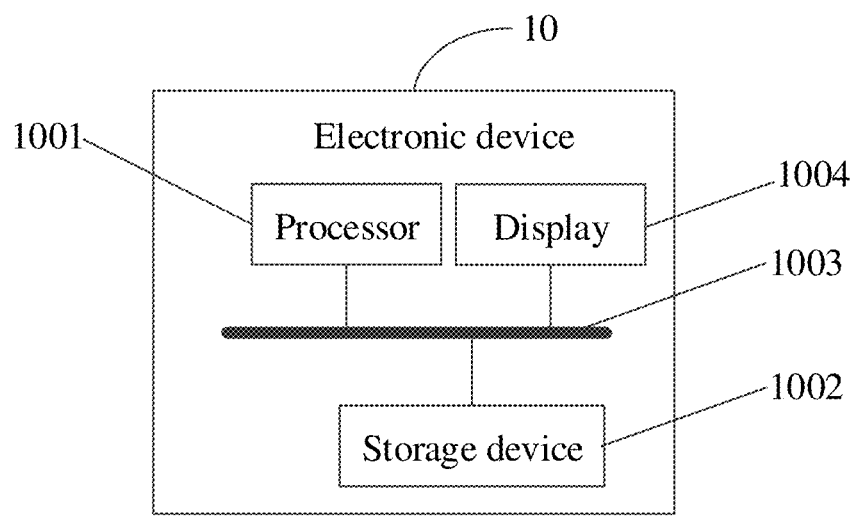
FIG. 10 is a schematic diagram showing a structure of an electronic device according to an embodiment of the present disclosure.

According to an embodiment of the present disclosure, an electronic device is provided. The electronic device may be applied in the image processing method according to any of the embodiments corresponding to FIG. 1, FIG. 2, FIG. 4, FIG. 5, and FIG. 8. Referring to FIG. 10, an electronic device 10 (the electronic device 10 in FIG. 10 corresponds to the image processing apparatus 9 in FIG. 9) includes a processor 1001, a storage device 1002, a communication bus 1003, and a display 1004.

The communication bus 1003 is configured to implement a communication connection among the processor 1001, the storage device 1002, and the display 1004.

The processor 1001 is configured to execute an image processing program stored in the storage device 1002 to implement actions of: obtaining a trigger event from an interface of a photographing preview image; and invoking and displaying a sharing interface according to the trigger event, and displaying, in the sharing interface, one or more icons of one or more image sharing applications supported by an operating system of an electronic device. Each of the one or more icons is configured to share, in response to being triggered, an image corresponding to a thumbnail displayed in the interface of the photographing preview image via the application associated with the icon.

In another embodiment of the present disclosure, the processor 1001 is configured to execute an image processing program stored in the storage device 1002 to implement actions of: obtaining, from the interface of the photographing preview image, operation information of an operator on the thumbnail; and generating the trigger event in response to determining that the operation information indicates invocation and display of the sharing interface.

In another embodiment of the present disclosure, the processor 1001 is configured to execute an image processing program stored in the storage device 1002 to implement actions of: obtaining an operation gesture of an operator from the interface of the photographing preview image; and generating the trigger event in response to determining that the operation gesture indicates invocation and display of the sharing interface.

In another embodiment of the present disclosure, the processor 1001 is configured to execute an image processing program stored in the storage device 1002 to implement actions of: invoking and displaying an editing interface according to the trigger event, and displaying the image corresponding to the thumbnail in the editing interface; editing the image in response to an editing operation on the image in the editing interface, and obtaining and saving the edited image, the image corresponding to the thumbnail displayed in the interface of the photographing preview image being the edited image; and invoking the sharing interface in response to a sharing operation on the edited image. The display 1004 is configured to display the sharing interface.

In another embodiment of the present disclosure, the processor 1001 is configured to execute an image processing program stored in the storage device 1002 to implement actions of: invoking the interface of the photographing preview image in response to a hiding operation in the editing interface. The display 1004 is configured to display the interface of the photographing preview image.

In another embodiment of the present disclosure, the processor 1001 is configured to execute an image processing program stored in the storage device 1002 to implement actions of: sharing, in response to a selection operation performed by an operator on at least one of the one or more icons, the image corresponding to the thumbnail via an application associated with the at least one icon.

In another embodiment of the present disclosure, the display 1004 is configured to display the one or more icons in the sharing interface together with the image corresponding to the thumbnail. The processor 1001 is configured to execute an image processing program stored in the storage device 1002 to implement actions of: performing, in response to a switching operation on the displayed image in the sharing interface, image switching based on an image stored in an image storage unit of the electronic device; and obtaining a target image selected by the operator during the image switching. The processor 1001 is further configured to, subsequent to the operation of sharing the image corresponding to the thumbnail via the application associated with the at least one icon, share the target image via the application associated with the at least one icon.

For example, the processor 1001 may be an integrated circuit chip having processing capabilities for signals, such as a general purpose processor, a Digital Signal Processor (DSP), or another programmable logic device, a discrete gate or a transistor logic device, a discrete hardware component, etc. The general purpose processor may be a microprocessor or any conventional processor, etc.

It should be noted that reference to specific implementation processes of the steps performed by the processor according to this embodiment may be made to implementation processes in the image processing method according to any of the embodiments corresponding to FIG. 1, FIG. 2, FIG. 4, FIG. 5, and FIG. 8, and thus details thereof will be omitted here.

According to an embodiment of the present disclosure, a computer-readable storage medium is provided. The computer-readable storage medium stores one or more programs. The one or more programs are executable by one or more processors to implement actions of: obtaining a trigger event from an interface of a photographing preview image; and invoking and displaying a sharing interface according to the trigger event, and displaying, in the sharing interface, one or more icons of one or more image sharing applications supported by an operating system of an electronic device. Each of the one or more icons is configured to share, in response to being triggered, an image corresponding to a thumbnail displayed in the interface of the photographing preview image via the application associated with the icon.

In another embodiment of the present disclosure, the one or more programs are executable by the one or more processors to further implement actions of: obtaining, from the interface of the photographing preview image, operation information of an operator on the thumbnail; and generating the trigger event in response to determining that the operation information indicates invocation and display of the sharing interface.

In another embodiment of the present disclosure, the one or more programs are executable by the one or more processors to further implement actions of: obtaining an operation gesture of an operator from the interface of the photographing preview image; and generating the trigger event in response to determining that the operation gesture indicates invocation and display of the sharing interface.

In another embodiment of the present disclosure, the one or more programs are executable by the one or more processors to further implement actions of: invoking and displaying an editing interface according to the trigger event, and displaying the image corresponding to the thumbnail in the editing interface; editing the image in response to an editing operation on the image in the editing interface, and obtaining and saving the edited image, the image corresponding to the thumbnail displayed in the interface of the photographing preview image being the edited image; and invoking and displaying the sharing interface in response to a sharing operation on the edited image.

In other embodiments of the present disclosure, the one or more programs are executable by the one or more processors to further implement actions of: invoking and displaying the interface of the photographing preview image in response to a hiding operation in the editing interface.

In another embodiment of the present disclosure, the one or more programs are executable by the one or more processors to further implement actions of: sharing, in response to a selection operation performed by an operator on at least one of the one or more icons, the image corresponding to the thumbnail via an application associated with the at least one icon.

In another embodiment of the present disclosure, the one or more programs are executable by the one or more processors to further implement actions of: displaying the one or more icons in the sharing interface together with the image corresponding to the thumbnail; performing, in response to a switching operation on the displayed image in the sharing interface, image switching based on an image stored in an image storage unit of the electronic device; and obtaining a target image selected by the operator during the image switching. The one or more programs are further executable by the one or more processors to further implement actions of: subsequent to the operation of sharing the image corresponding to the thumbnail via the application associated with the at least one icon, sharing the target image via the application associated with the at least one icon.

It should be noted that reference to specific implementation processes of the steps performed by the processor according to this embodiment may be made to implementation processes in the image processing method according to any of the embodiments corresponding to FIG. 1, FIG. 2, FIG. 4, FIG. 5, and FIG. 8, and thus details thereof will be omitted here.

Those skilled in the art should understand that the embodiments of the present disclosure can be provided as a method, a system, or a computer program product. Therefore, the present disclosure may adopt a form of a hardware embodiment, a complete software embodiment, or an embodiment combining software and hardware. In addition, the present disclosure may adopt a form of a computer program product implemented on one or more computer-usable storage media (including but not limited to disk storage, optical storage, etc.) including computer-usable program codes.

The present disclosure is described with reference to flowcharts and/or block diagrams of the method, the device (system), and the computer program product according to the embodiments of the present disclosure. It should be understood that each process and/or block in the flowcharts and/or block diagrams, and a combination of processes and/or blocks in the flowcharts and/or block diagrams can be realized by computer program instructions. These computer program instructions can be provided to a processor of a general-purpose computer, a special-purpose computer, an embedded processor, or other programmable data processing device to generate a machine, such that instructions executed by the processor of the computer or other programmable data processing device generate an apparatus for implementing functions specified in one or more processes in the flowchart and/or one or more blocks in the block diagram.

These computer program instructions can also be stored in a computer-readable memory that can guide a computer or other programmable data processing devices to work in a specific manner, such that instructions stored in the computer-readable memory produce an article of manufacture including an instruction device. The instruction device implements functions specified in one or more processes in the flowchart and/or one or more blocks in the block diagram.

These computer program instructions can also be loaded on a computer or other programmable data processing devices to enable a series of operation steps to be executed on the computer or other programmable devices for producing computer-implemented processing, such that instructions executed on the computer or other programmable devices provide steps for implementing functions specified in one or more processes in the flowchart and/or one or more blocks in the block diagram.

The above description illustrates only preferred embodiments of the present disclosure, and is not intended to limit the protection scope of the present disclosure.

INDUSTRIAL APPLICABILITY

With the image processing method, the image processing apparatus, the electronic device, and the storage medium according to the embodiments of the present disclosure, the trigger event is obtained from the interface of the photographing preview image. The sharing interface is invoked and displayed according to the trigger event. The one or more icons of the one or more image sharing applications supported by the operating system of the electronic device are displayed in the sharing interface. Each of the one or more icons is configured to share, in response to being triggered, the image corresponding to the thumbnail displayed in the interface of the photographing preview image via the application associated with the icon. That is, in the present disclosure, the sharing interface is invoked according to the trigger event. The sharing interface provides icons of all image sharing applications supported by the operating system of the electronic device, such that the image corresponding to the thumbnail can be quickly shared through any application under the operating system, thereby providing a quick image sharing portal and enhancing the user experience.

What is claimed is:
1. An image processing method, comprising:
  obtaining a trigger event from an interface of a photographing preview image, wherein the interface of the photographing preview image comprises a photographing preview window, a control region, and a thumbnail region; the photographing preview window is a viewfinder, the control region comprises at least a photographing button configured to control photographing to obtain a photographed content, and the thumbnail region is configured to show a thumbnail of a recently captured image;
  displaying a sharing interface in response to the trigger event, and displaying, in the sharing interface, one or more icons of one or more image sharing applications supported by an operating system of an electronic device, and
  sharing, in response to a selection operation performed on at least one of the one or more icons, the image represented by the thumbnail via an application associated with the at least one icon.
2. The method according to claim 1, wherein said obtaining the trigger event from the interface of the photographing preview image comprises:
  obtaining, from the interface of the photographing preview image, operation information of an operator on the thumbnail; and generating the trigger event in response to determining that the operation information indicates invocation and display of the sharing interface.

3. The method according to claim 2, wherein the obtaining, from the interface of the photographing preview image, operation information of the operator on the thumbnail comprises:
in response to detecting a click operation performed on a dynamic arrow region on the thumbnail in the interface of the photographing preview image, obtaining, as the operation information, an operation position of an edge of the thumbnail and an operation event of the click operation;
in response to detecting a sliding operation performed on a region of the thumbnail in the interface of the photographing preview image, obtaining, as the operation information, an operation position corresponding to a trajectory from one point on the thumbnail to another point in the interface of the photographing preview image and an operation event of the sliding operation.

4. The method according to claim 1, wherein said obtaining the trigger event from the interface of the photographing preview image comprises:
obtaining an operation gesture of an operator from the interface of the photographing preview image; and
generating the trigger event in response to determining that the operation gesture indicates invocation and display of the sharing interface.

5. The method according to claim 1, wherein said displaying the sharing interface in response to the trigger event comprises:
displaying an editing interface in response to the trigger event, and displaying the image represented by the thumbnail in the editing interface;
editing the image in response to an editing operation on the image in the editing interface, and obtaining and saving the edited image, the image represented by the thumbnail displayed in the interface of the photographing preview image being the edited image; and
displaying the sharing interface in response to a sharing operation on the edited image.

6. The method according to claim 5, further comprising, subsequent to said displaying the image corresponding to the thumbnail in the editing interface:
displaying the interface of the photographing preview image in response to a hiding operation in the editing interface.

7. The method according to claim 1, wherein said displaying, in the sharing interface, the one or more icons of the one or more image sharing applications supported by the operating system of the electronic device comprises:
displaying the one or more icons in the sharing interface together with the image represented by the thumbnail, wherein the image represented by the thumbnail is an originally captured image, and the image displayed in the sharing interface is a to-be-shared image,
wherein the method further comprises:
in response to a switching operation on the image displayed in the sharing interface, switching the image represented by the thumbnail and displayed in the sharing interface into an image selected from an image storage unit of the electronic device; and
obtaining the switched-to image as an updated to-be-shared image; and wherein said sharing the image represented by the thumbnail via the application associated with the at least one icon comprises:
sharing the updated to-be-shared image via the application associated with the at least one icon.

8. An electronic device, comprising:
a processor;
a memory; and
a communication bus,
wherein the communication bus is configured to implement a communication connection between the processor and the memory; and
wherein the processor is configured to execute an image processing program stored in the memory to:
obtain a trigger event from an interface of a photographing preview image, wherein the interface of the photographing preview image comprises a photographing preview window, a control region, and a thumbnail region; the photographing preview window is a viewfinder, the control region comprises at least a photographing button configured to control photographing to obtain a photographed content, and the thumbnail region is configured to show a thumbnail of a recently captured image;
display a sharing interface in response to the trigger event, and display, in the sharing interface, one or more icons of one or more image sharing applications supported by an operating system of an electronic device, and
share, in response to a selection operation performed on at least one of the one or more icons, the image represented by the thumbnail via an application associated with the at least one icon.

9. The electronic device according to claim 8, wherein the processor is configured to execute the image processing program stored in the memory to:
obtain, from the interface of the photographing preview image, operation information of an operator on the thumbnail; and
generate the trigger event in response to determining that the operation information indicates invocation and display of the sharing interface.

10. The electronic device according to claim 9, wherein the processor is further configured to execute the image processing program stored in the memory to:
in response to detecting a click operation performed on a dynamic arrow region on the thumbnail in the interface of the photographing preview image, obtain, as the operation information, an operation position of an edge of the thumbnail and an operation event of the click operation;
in response to detecting a sliding operation performed on a region of the thumbnail in the interface of the photographing preview image, obtain, as the operation information, an operation position corresponding to a trajectory from one point on the thumbnail to another point in the interface of the photographing preview image and an operation event of the sliding operation.

11. The electronic device according to claim 8, wherein the processor is configured to execute the image processing program stored in the memory to:
obtain an operation gesture of an operator from the interface of the photographing preview image; and
generate the trigger event in response to determining that the operation gesture indicates invocation and display of the sharing interface.

12. The electronic device according to claim 8, wherein the processor is configured to execute the image processing program stored in the memory to:
- display an editing interface in response to the trigger event, and display the image represented by the thumbnail in the editing interface;
- edit the image in response to an editing operation on the image in the editing interface, and obtain and save the edited image, the image represented by the thumbnail displayed in the interface of the photographing preview image being the edited image; and
- display the sharing interface in response to a sharing operation on the edited image.

13. The electronic device according to claim 12, wherein the processor is further configured to execute the image processing program stored in the memory to: subsequent to displaying the image corresponding to the thumbnail in the editing interface,
- display the interface of the photographing preview image in response to a hiding operation in the editing interface.

14. The electronic device according to claim 8, wherein the processor is configured to execute the image processing program stored in the memory to:
- display the one or more icons in the sharing interface together with the image represented by the thumbnail, wherein the image represented by the thumbnail is an originally captured image, and the image displayed in the sharing interface is a to-be-shared image,
- wherein the processor is further configured to execute the image processing program stored in the memory to:
- in response to a switching operation on the image displayed in the sharing interface, switching the image represented by the thumbnail and displayed in the sharing interface into an image selected from an image storage unit of the electronic device; and
- obtain the switched-to image as an updated to-be-shared image; and
- wherein the processor is further configured to execute the image processing program stored in the memory to:
- share the updated to-be-shared image via the application associated with the at least one icon.

15. A non-transitory storage medium, having one or more programs stored thereon, wherein the one or more programs are executable by one or more processors to:
- obtain a trigger event from an interface of a photographing preview image, wherein the interface of the photographing preview image comprises a photographing preview window, a control region, and a thumbnail region; the photographing preview window is a viewfinder, the control region comprises at least a photographing button configured to control photographing to obtain a photographed content, and the thumbnail region is configured to show a thumbnail of a recently captured image;
- display a sharing interface in response to the trigger event, and display, in the sharing interface, one or more icons of one or more image sharing applications supported by an operating system of an electronic device, and
- share, in response to a selection operation performed on at least one of the one or more icons, the image represented by the thumbnail via an application associated with the at least one icon.

16. The non-transitory storage medium according to claim 15, wherein the one or more programs are executable by one or more processors to:
- obtain, from the interface of the photographing preview image, operation information of an operator on the thumbnail; and
- generate the trigger event in response to determining that the operation information indicates invocation and display of the sharing interface.

17. The non-transitory storage medium according to claim 16, wherein the one or more programs are executable by one or more processors to:
- in response to detecting a click operation performed on a dynamic arrow region on the thumbnail in the interface of the photographing preview image, obtain, as the operation information, an operation position of an edge of the thumbnail and an operation event of the click operation;
- in response to detecting a sliding operation performed on a region of the thumbnail in the interface of the photographing preview image, obtain, as the operation information, an operation position corresponding to a trajectory from one point on the thumbnail to another point in the interface of the photographing preview image and an operation event of the sliding operation.

18. The non-transitory storage medium according to claim 15, wherein the one or more programs are executable by one or more processors to:
- obtain an operation gesture of an operator from the interface of the photographing preview image; and
- generate the trigger event in response to determining that the operation gesture indicates invocation and display of the sharing interface.

19. The non-transitory storage medium according to claim 15, wherein the one or more programs are executable by one or more processors to:
- display an editing interface in response to the trigger event, and display the image represented by the thumbnail in the editing interface;
- edit the image in response to an editing operation on the image in the editing interface, and obtain and save the edited image, the image represented by the thumbnail displayed in the interface of the photographing preview image being the edited image; and
- display the sharing interface in response to a sharing operation on the edited image.

20. The non-transitory storage medium according to claim 15, wherein the one or more programs are executable by one or more processors to display the one or more icons in the sharing interface together with the image represented by the thumbnail, wherein the image represented by the thumbnail is an originally captured image, and the image displayed in the sharing interface is a to-be-shared image,
- wherein the one or more programs are executable by one or more processors to: in response to a switching operation on the image displayed in the sharing interface, switching the image represented by the thumbnail and displayed in the sharing interface into an image selected from an image storage unit of the electronic device; and obtain the switched-to image as an updated to-be-shared image; and
- wherein the one or more programs are executable by one or more processors to: share the updated to-be-shared image via the application associated with the at least one icon.

* * * * *